3,372,166
BENZOXAZOLONES AND BENZOTHIAZOLONES
William J. Houlihan, Mountain Lakes, N.J., assignor to
Sandoz Inc., Hanover, N.J.
No Drawing. Continuation-in-part of application Ser. No. 379,749, July 1, 1964. This application Feb. 23, 1967, Ser. No. 617,823
4 Claims. (Cl. 260—304)

ABSTRACT OF THE DISCLOSURE

The compounds are 4a - substituted - isoindolo[1,2-b] benzoxazol- (and benzothiazol-)11-ones which are useful as sedatives and tranquilizers. They are prepared by reacting an o-acylbenzoic acid with an o-aminophenol (or thiophenol).

This application is a continuation-in-part of application Ser. No. 379,749 filed July 1, 1964, now U.S. Patent No. 3,329,684 issued July 4, 1967.

This invention provides three classes of compounds which are generically represented by the formula

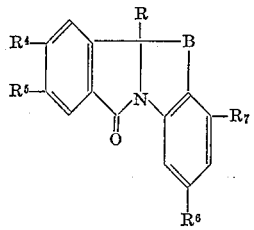

wherein
R is either lower alkyl (preferably having at least two carbon atoms when B is =S), e.g., methyl, ethyl, propyl, isopropyl and butyl; or

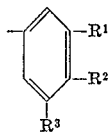

each of $R^1$, $R^2$, $R^3$, $R^4$ and $R^5$ is, independently, either a hydrogen atom (—H); lower alkyl, e.g. methyl, ethyl, propyl, isopropyl and butyl; lower alkoxy, e.g. methoxy, ethoxy, propoxy, isopropoxy and butoxy; primary amino (—NH$_2$); a chlorine atom (—Cl); a bromine atom (—Br); a fluorine atom (—F); or trifluoromethyl (—CF$_3$), with the proviso that a plurality of trifluoromethyl groups are not ortho to each other;
each of $R^6$ and $R^7$ is, independently, either a hydrogen atom (—H); a fluorine atom (—F); a chlorine atom (—Cl); —SR$^8$; —OR$^8$; lower alkyl, e.g. methyl, ethyl, propyl, isopropyl and butyl; and trifluoromethyl (—CF$_3$), with the proviso that both $R^6$ and $R^7$ are not trifluoromethyl in the same compound;
$R^8$ is lower alkyl, e.g. methyl, ethyl, propyl, isopropyl and butyl; and
B is:
=NH for the first class of compounds;
=O for the second class of compounds; and
=S for the third class of compounds.

The compounds of this invention are prepared by admixing and heating an o-acylbenzoic acid (II) with an o-(HB—) substituted aniline (III) in an inert solvent with an acid catalyst according to the reaction scheme:

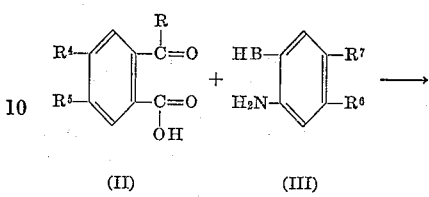

wherein each of R, $R^4$, $R^5$, $R^6$, $R^7$ and B has its above-ascribed meaning, as it does throughout the entire disclosure. Compounds (II) and (III) are either known or are prepared by published procedures from compounds which are available.

The inert solvent is one which is inert, at the reaction temperature, with both the reactants and the reaction product. Suitable solvents are polar solvents, e.g. dimethylformamide, diethylformamide, dioxane, chlorobenzene and pyridine; benzenes, e.g. benzene, toluene, dichlorobenzene; cycloalkanes, e.g. cyclohexane; and other high-boiling hydrocarbons, e.g. tetralin.

The temperature at which the reaction is effected is any temperature from room temperature (20° C.) to the boiling point of the selected solvent system.

The acid catalyst is either an organic acid or an inorganic acid. Para-toluenesulfonic acid is preferred, but other acids, such as alkane sulfonic, e.g. methane sulfonic; arlysulfonic, e.g. phenylsulfonic; phosphoric; acid ion exchange resin, e.g. "Dowex-50"; and acid activated aluminosilicates, e.g. "Tonsil," also produce favorable results.

Compounds of this invention are stable compounds useful as sedatives, tranquilizers and antidepressants. They are administered to, e.g., mammals either orally or parenterally in daily doses from 2.5 to 5 milligrams per kilogram of body weight. The daily dosage is given either as a single dose or in from two to four equally divided doses. Compounds of this invention are CNS (central nervous system) active and antagonize amphetamine's CNS activity.

Each of the pharmaceutically active compounds of this invention, may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

|  | Parts |
|---|---|
| Title compound of Example 9 | 45 |
| Tragacanth | 2 |
| Lactose | 44.5 |
| Corn starch | 5 |
| Talcum | 3 |
| Magnesium stearate | 0.5 |
| Alcohol SD–30 | Q.s. |
| Purified water | Q.s. |

The examples are merely illustrative of the invention. Any contemplated combination of substitution within the scope of Formula I is obtained in the same manner as hereinafter set forth by the corresponding selection of reactants. Corresponding compounds of the first, second and third classes of compounds are prepared in the same manner with only an appropriate change in reactant (III).

In said examples, unless otherwise specified, all parts are parts by weight, all temperatures are in degrees centigrade, and the relationship between parts by weight and parts by volume is the same as that between the kilogram and the liter.

EXAMPLE 1

*4a-phenyl-isoindolo-5H-[1,2-b]benzimidazol-11-one*

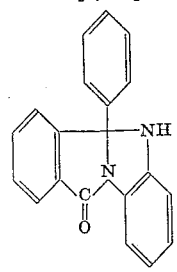

Admix in a flask equipped with a stirrer and a Dean-Stark tube (for removing water) 22.6 parts (0.10 mole) of o-benzoylbenzoic acid, 16.2 parts (0.15 mole) of o-phenylenediamine, 0.2 part of p-toluene sulfonic acid and 350 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from ethanol-water to obtain 19.6 parts of the title compound, melting point (M.P.) 158°.

In this example o-benzoylbenzoic acid is used as the compound (II) and o-phenylenediamine, as the compound (III). The example is repeated to obtain corresponding compounds with comparable results replacing said compounds (II) and (III) as follows:

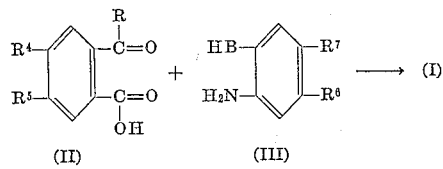

|  | R | R⁴ | R⁵ | R⁶ | R⁷ | B |
|---|---|---|---|---|---|---|
| (a) | phenyl | —H | —H | —S—iPr | —O—Bu | NH |
| (b) | 4-methylphenyl | —H | —H | —O—iPr | —H | S |
| (c) | 2-O-Bu, 5-Et-phenyl | —H | —Cl | —H | —O—Bu | NH |
| (d) | 4-Br-phenyl | —Pr | —H | —O—Me | —O—Et | O |
| (e) | 4-F-phenyl | —H | —iPr | —Et | —CF₃ | S |
| (f) | 2-Bu, 5-Cl-phenyl | —Me | —O—iPr | —Me | —Pr | NH |
| (g) | 2-NH₂, 5-O-Me-phenyl | —H | —Et | —iPr | —H | O |
| (h) | 2-O-Et, 5-CF₃-phenyl | —H | —H | —Cl | —Bu | S |
| (i) | 2-CF₃, 5-NH₂, ?-CF₃-phenyl | —O—Pr | —H | —F | —F | O | where
Me is methyl
Et is ethyl
Pr is propyl
iPr is isopropyl, and
Bu is butyl

EXAMPLE 2

*4a-methyl-8-chloro-isoindolo-5H-[1,2-b]benzimidazol-11-one*

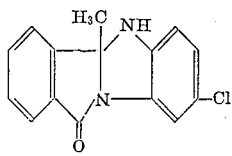

Admix in a flask equipped with a stirrer and a Dean-Stark tube (for removing water) 8.2 parts (0.05 mole) of o-acetylbenzoic acid, 14.3 parts (0.10 mole) of 4-chlorophenylene diamine, 250 parts by volume of xylene and .03 part of p-toluenesulfonic acid. Stir and reflux the obtained mixture until water ceases to separate in the Dean-Stark tube. Remove the solvent in vacuo in a rotary evaporator. Recrystallize from methanol to obtain 3.3 parts of title compound, M.P. 233° to 235°.

By replacing the o-acetylbenzoic acid (II) and the 4-chloro-o-phenylene diamine (III) by their counterparts defined by substituents in the following table, comparable results and corresponding compounds are obtained.

| | R | R⁴ | R⁵ | R⁶ | R⁷ | B |
|---|---|---|---|---|---|---|
| (a) | —Me | —H | —H | —H | —H | O |
| (b) | —Et | —Bu | —Cl | —F | —Me | S |
| (c) | —Pr | —O—Me | —iPr | —H | —Cl | NH |
| (d) | —iPr | —Me | —O—Et | —S—Me | —H | O |
| (e) | —Bu | —CF₃ | —Et | —CF₃ | —S—Et | S |

EXAMPLE 3

*4a-phenyl-8-chloro-isoindolo-5H-[1,2-b]benzimidazol-11-one*

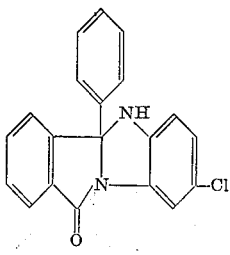

Admix in a flask equipped with a stirrer and a Dean-Stark tube 11.3 parts (0.05 mole) of o-benzoylbenzoic acid, 10.0 parts (0.07 mole) of 4-chloro-o-phenylenediamine, 0.5 part of p-toluenesulfonic acid and 250 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-methanol-water to obtain 5.3 parts of the title compound, M.P. 210° to 211°.

Replacing the 4-chloro-o-phenylenediamine with an equivalent of either 2-amino-4-chlorophenol or 2-amino-4-chlorothiophenol results in the preparation, in the same manner, of the corresponding compound (I).

EXAMPLE 4

*4a-(p-tolyl)-8-chloro-isoindolo-5H-[1,2-b]benzimidazol-11-one*

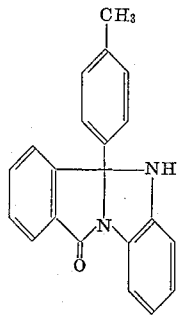

Admix in a flask equipped with a stirrer and a Dean-Stark tube 12.0 parts (0.05 mole) of o-(p-tolyl)-benzoic acid, 10.0 parts (0.07 mole) of 4-chloro-o-phenylenediamine, 0.5 part of p-toluenesulfonic acid and 250 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-methanol-water to obtain 9.1 parts of the title compound, M.P. 210° to 212°.

Replacing the 4-chloro-o-phenylenediamine with an equivalent 2-amino-4-chlorophenol or 2-amino-4-chlorothiophenol results in the preparation, in the same manner, of the corresponding compound (I).

EXAMPLE 5

*4a-(p-chlorophenyl)-8-chloro-isoindolo-5H-[1,2-b] benzimidazol-11-one*

Admix in a flask equipped with a stirrer and a Dean-Stark tube 13.0 parts (0.05 mole) of o-(p-chlorobenzoyl)-benzoic acid, 10.0 parts (0.07 mole) of 4-chloro-o-phenylenediamine, 250 parts by volume of toluene, and 0.5 part of p-toluene sulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallized from DMF-methanol-water to obtain 8.0 parts of the title compound, M.P. 184° to 185°.

Replacing the 4-chloro-o-phenylenediamine with an equivalent of either 2-amino-4-chlorophenol or 2-amino-4-chlorothiophenol results in the preparation, in the same manner, of the corresponding compound (I).

EXAMPLE 6

*4a-phenyl-8-methoxy-isoindolo-5H-[1,2-b]benzimidazol-11-one*

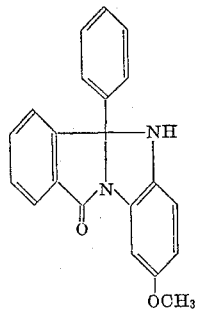

Admix in a flask equipped with a stirrer and a Dean-Stard tube 3.5 parts (0.015 mole) of o-benzoylbenzoic acid, 3.0 parts (0.022 mole) of 4-methoxy-o-phenylenediamine, 0.2 part of p-toluene-sulfonic acid and 75 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-water to obtain 4.7 parts of the title compound, M.P. 108° to 111°.

Replacing the 4-methoxy-o-phenylenediamine with an equivalent of either 2-amino-4-methoxyphenol or 2-amino-4-methoxythiophenol results in the preparation, in similar manner, of the corresponding compound (I).

EXAMPLE 7

*4a-methyl-isoindolo-5H-[1,2-b]benzimidazol-11-one*

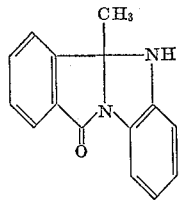

Admix in a flask equipped with a stirrer and a Dean-Stark tube 4.1 parts (0.025 mole) of o-acetylbenzoic acid, 5.4 parts (0.50 mole) of o-phenylene diamine, 150 parts by volume of toluene and 0.1 part of p-toluene sulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallize from i-propanol to obtain 3.1 parts of the title compound, M.P. 183° to 184°.

Replacing the o-phenylenediamine with an equivalent of either 2-amino-4- (or -5-)methylphenol or 2-amino-4- (or -5-)trifluoromethylthiophenol results in the preparation, in similar manner, of the corresponding compound (I).

EXAMPLE 8

*4a-(p-chlorophenyl)-8-methoxy-isoindolo-5H-[1,2-b]benzimidazol-11-one*

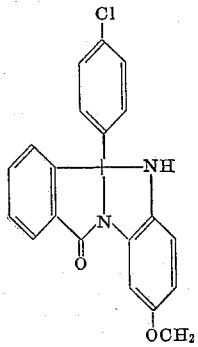

Admix in a flask equipped with a stirrer and a Dean-Stark tube 6.8 parts (0.026 mole) of o-(p-chlorobenzoyl)-benzoic acid, 5.0 parts (0.036 mole) of 4-methoxy-o-phenylene diamine, 150 parts by volume of toluene and 0.3 part of p-toluenesulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-water to obtain 8.2 parts of the title compound, M.P. 112° to 114°.

Replacing the 4-methoxy-o-phenylenediamine with an equivalent of either 2-amino-4-methoxyphenol or 2-amino-4-methoxythiophenol results in the preparation, in similar manner, of the corresponding compound (I).

EXAMPLE 9

*4a-phenyl-isoindolo[1,2-b]benzoxazol-11-one*

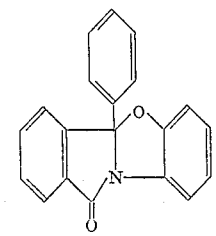

Admix in a flask equipped with a stirrer and a Dean-Stark tube 11.3 parts (0.05 mole) of o-benzoylbenzoic acid, 8.2 parts (0.075 mole) of o-aminophenol, 0.2 part of p-toluenesulfonic acid and 150 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from methanol-water to obtain 8.6 parts of the title compound, M.P. 125° to 128°.

Replacing the o-aminophenol with an equivalent of ether 2-amino-5-chloro- (or fluoro-)phenol or 2-amino-4,5-dimethylphenol results in the preparation, in similar manner, of the corresponding compound (I).

EXAMPLE 10

*4a-phenyl-isoindolo[1,2-b]benzothiazol-11-one*

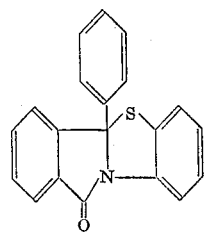

Admix in a flask equipped with a stirrer and a Dean-Stark tube 11.3 parts (0.05 mole) of o-benzoylbenzoic acid, 8.8 parts (0.07 mole) of o-aminothiophenol, 200 parts by volume of technical o-dichlorobenzenes and 0.5 part of p-toluenesulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallize from chloroform-ether to obtain 11.1 parts of the title compound, M.P. 144° to 148°.

Replacing the o-aminothiophenol with an equivalent of either 2-amino-4- (or -5-)bromothiophenol or 2-amino-5-thiomethylthiophenol results in the preparation, in similar manner, of the corresponding compound (I).

It is thought that the invention will be understood from the foregoing description and it is apparent that various changes may be made in the products without departing from the spirit and scope of the invention or sacrificing its material advantages, the compounds hereinbefore described being merely illustrative of embodiments of the invention.

What is claimed is:
1. A compound of the formula

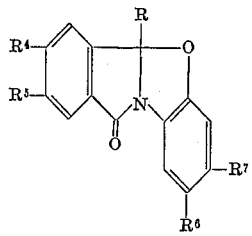

wherein

R is 3-$R^1$-4-$R^2$-5-$R^3$-phenyl;

each of $R^1$, $R^2$, $R^3$, $R^4$ and $R^5$ is, independently, a member selected from the group consisting of a hydrogen atom, lower alkyl, lower alkoxy, primary amino, a chlorine atom, a bromine atom, a fluorine atom and trifluoromethyl, with the proviso that $R^2$ is other than trifluoromethyl when either of $R^1$ or $R^3$ is trifluoromethyl; and provided further that at the most one of $R^4$ and $R^5$ is trifluoromethyl; and each of $R^6$ and $R^7$ is, independently, a member selected from the group consisting of a hydrogen atom, a fluorine atom, a chlorine atom, lower alkylthio, lower alkoxy, lower alkyl and trifluoromethyl, with the proviso that at most one of $R^6$ and $R^7$ is trifluoromethyl.

2. The compound according to claim 1 which is 4a-phenyl-isoindolo[1,2-b]benzoxazol-11-one.

3. A compound of the formula

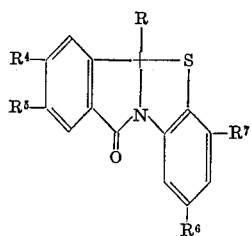

wherein

R is 3-$R^1$-4-$R^2$-5-$R^3$-phenyl;

each of $R^1$, $R^2$, $R^3$, $R^4$ and $R^5$ is, independently, a member selected from the group consisting of a hydrogen atom, lower alkyl, lower alkoxy, primary amino, a chlorine atom, a bromine atom, a fluorine atom and trifluoromethyl, with the proviso that $R^2$ is other than trifluoromethyl when either of $R^1$ or $R^3$ is trifluoromethyl; and provided further that at the most one of $R^4$ and $R^5$ is trifluoromethyl; and each of $R^6$ and $R^7$ is, independently, a member selected from the group consisting of a hydrogen atom, a fluorine atom, a chlorine atom, lower alkylthio, lower alkoxy, lower alkyl and trifluoromethyl, with the proviso that at most one of $R^6$ and $R^7$ is trifluoromethyl.

4. A compound according to claim 3 which is 4a-phenyl-isoindolo[1,2-b]benzothiazol-11-one.

References Cited
UNITED STATES PATENTS

| | | | |
|---|---|---|---|
| 2,985,661 | 5/1961 | Hein et al. | 260—304 |
| 3,005,824 | 10/1961 | Domagk et al. | 260—307.4 |
| 3,309,378 | 3/1967 | Dunn | 260—307.4 |

OTHER REFERENCES

Oliver et al., J. Am. Chem. Soc., vol. 80 (1958), pp. 702–707.

ALEX MAZEL, *Primary Examiner.*

R. J. GALLAGHER, *Assistant Examiner.*